Patented Oct. 17, 1950

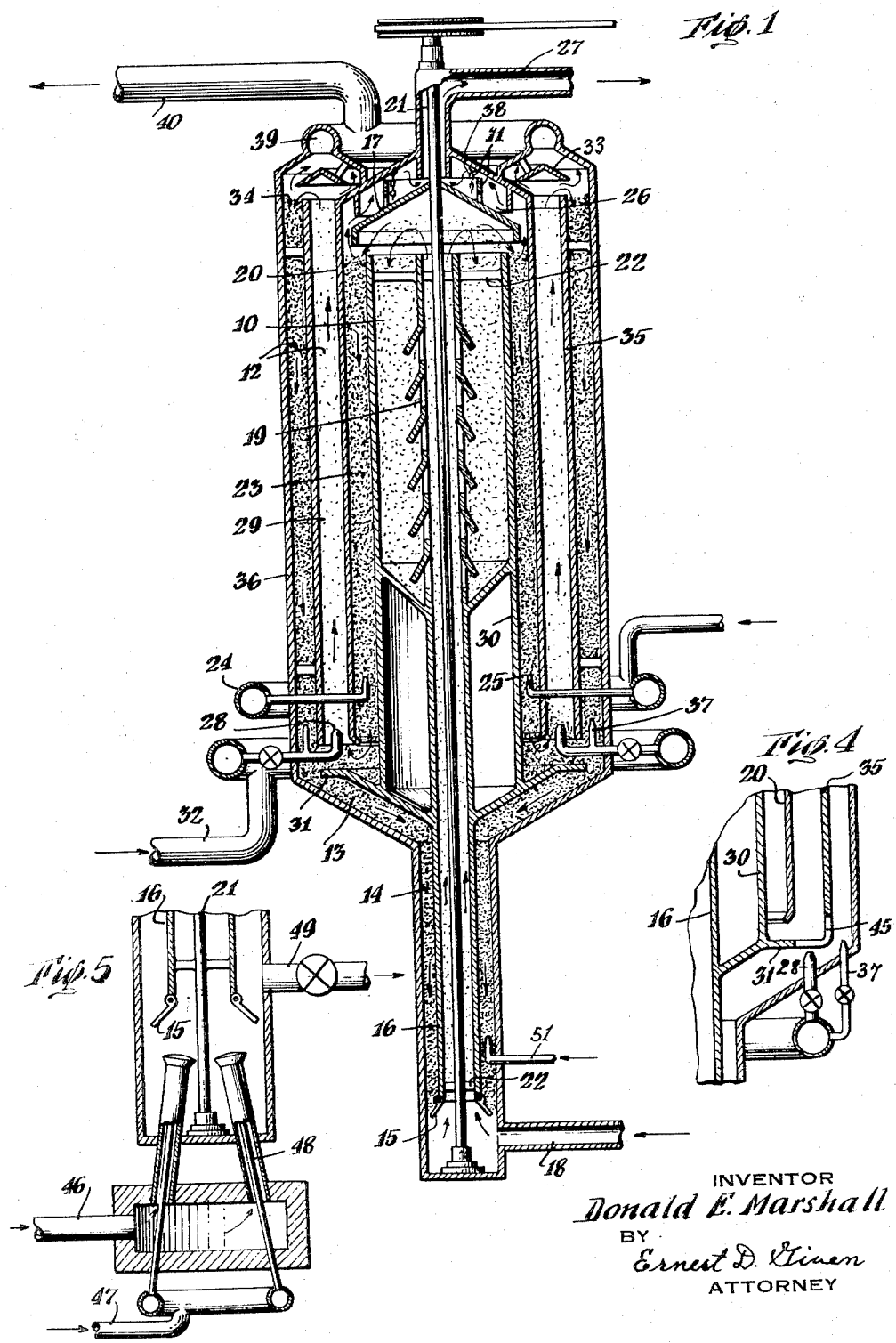

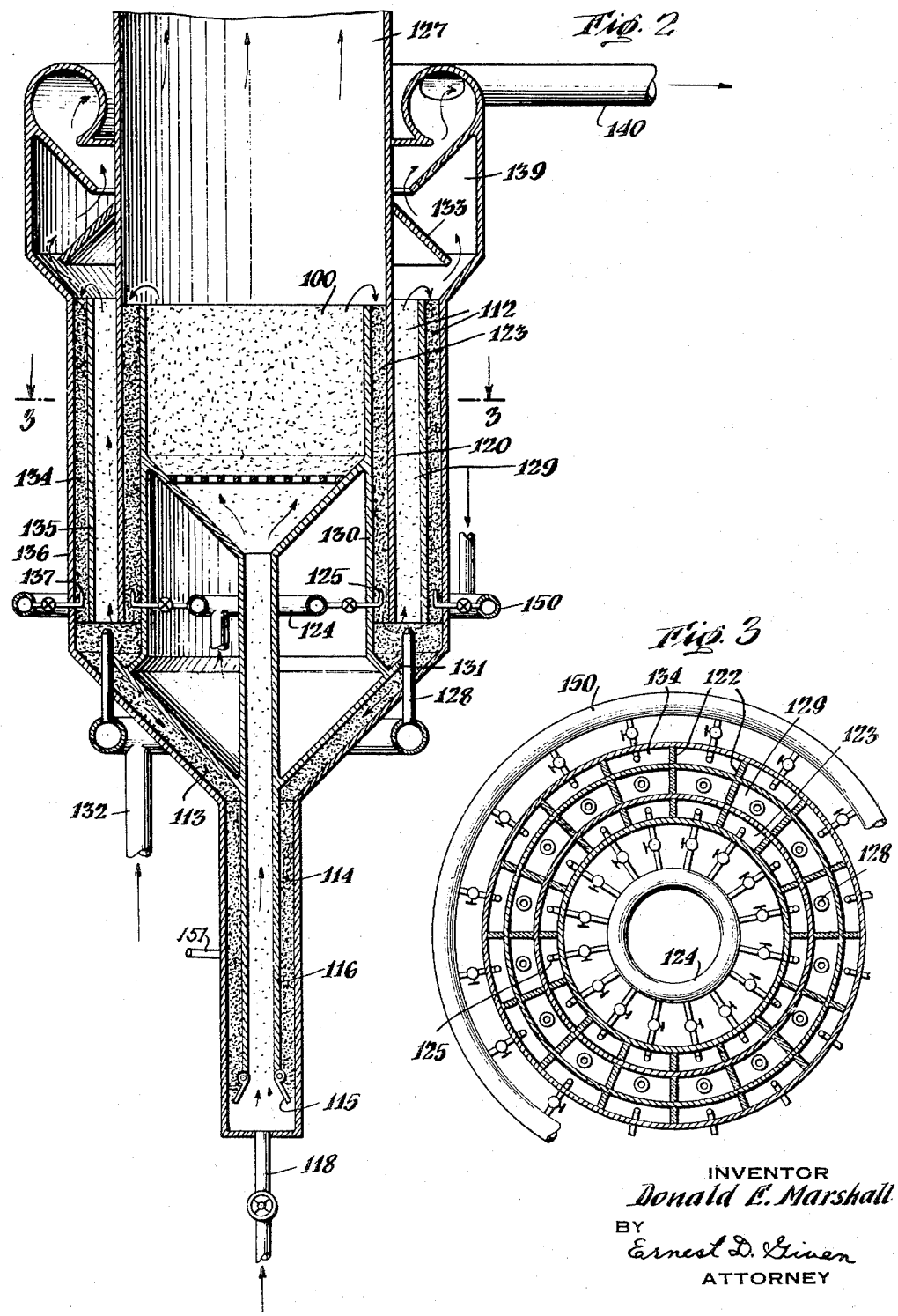

2,525,925

UNITED STATES PATENT OFFICE 2,525,925

PROCESS UTILIZING SOLID CARRIER PARTICLES

Donald E. Marshall, Summit, N. J.

Application August 21, 1946, Serial No. 692,115

10 Claims. (Cl. 196—52)

This invention relates to systems for continuously contacting gases with flowing solid particle beds such as catalytic cracking of petroleum and more particularly to those systems requiring two isolated zones for different types of reactions.

When applied to catalytic cracking of petroleum a catalyst in finely divided form is mixed with solid inert particles in finely divided form so that a sufficient quantity of mixture of solid particles is obtained which when regenerated after a catalytic reaction will supply sufficient heat to the liquid feed to vaporize it and maintain it at reaction temperature in the reaction zone.

Carbonaceous material is deposited on the solid particles during cracking, and when the solid particles are regenerated as by burning to remove the carbonaceous material, the solid particles become heated to a temperature above the cracking temperature and when these heated solid particles are mixed with the oil feed the oil feed is vaporized and heated to a cracking temperature.

In using the present system, in which the regeneration is effected in an annular chamber surrounding the cracking or reaction chamber, a symmetrical system is provided with the shortest possible paths of travel for the solid particles and practically all this travel is in a vertical direction, thus eliminating all elbow turns and connecting duct systems.

Another advantage of the present system is that the integral chamber exposes the minimum of surfaces to radiation losses and the annular chamber jackets the lower temperature reaction zone with the higher temperature regeneration zone in one heat exchange unit.

Another advantage is that by using cylindrical, concentric chambers of relatively small cross-section the difficulties of high or negative pressure designing are minimized and rotatable baffles are usable which solve most of the problems of gas-channeling or baffle surface fouling which might otherwise prevent the even flow of gases and solid particles.

Another advantage is that by utilizing sparger or jet recycling for the solids streams, the lowest back pressures and best exposure conditions are assured and the danger of blowing-out of "seals" between the two reaction zones is obviated.

Fig. 1 represents one form of apparatus using rotatable baffle assembly and a sparger-type recycling chamber for the reactor;

Fig. 2 represents another form of apparatus with stationary baffle systems, a fluidized-solids type chamber for the reactor and partitioned annulus cells to avoid channeling of the bed by the gases;

Fig. 3 represents a section through Fig. 2 along line 3—3;

Fig. 4 is a section partly broken away showing a modification; and

Fig. 5 is a similar view showing another modification.

Referring to the drawings and Fig. 1, the reference character 10 designates a reaction zone or vessel and the reference character 12 designates a regeneration zone or annular concentric chamber. Solid particles including inert and catalytic particles are withdrawn from the regenerator 12 by means of hopper 13 and the annular space in stand pipe 14 having a suitable control valve 15 for controlling the amount of solid particles which are indirectly introduced into the reaction zone 10 via the sparger tube 16 and reflecting baffle 17.

Liquid oil feed, preferably pre-heated, is introduced into the bottom portion of stand pipe 14 through line 18. The hot solid particles including the inert and catalyst particles flash the liquid into vapors which blow the solid particles up through rotatable sparger tube 16 and deflected by rotatable baffle 17 and deposited in the rotatable reaction chamber 10 where the sparger action causes particles to move inwardly through louvers 19 and recycle up the sparger tube, thus getting repeated exposure to the gases in suitable gas to solids ratio and with much less pressure than the back-pressure of an equivalent fluidized bed.

The reaction zone 10 is of a smaller diameter than the larger vessel 20 and is supported on the rotatable shaft 21 by suitable spiders 22, an annular space 23 is thus provided between reaction zone 10 and larger vessel 20 into which the solid particles overflow from the reaction zone 10.

Stripping steam is introduced into the solid particles in annular space 23 by means of header 24 and nozzles 25 set properly around the annular space 23 to remove volatile hydrocarbons from the solid particles.

As more oil and more solid particles are fed into the reaction zone 10, the reaction products in vapor form pass upwardly and around reflecting baffle 17 and through baffled space 26 above. Baffles 11 are staggered and mounted in space 26 so as to be self-cleaning using drag chains 38, if necessary. The cross-section of this settling chamber 26 for removing entrained solid particles can be much larger than reaction zone 10 if desired to reduce vapor velocity. Furthermore, the rotatable baffle 17 can be designed to sweep this enlarged section clean. Cracked vapors are discharged from line 27 to a fractionating tower, not shown.

In addition, the fluidized solid particles in relatively dense condition overflow the upper rim of the reaction vessel 10 and flow into the annular space 23 where additional quantities of vaporous reaction products are released. The solid particles in the annular space are maintained in fluidized condition and flow downwardly.

In catalytic reactions where the solid particles become contaminated or partially spent after a reaction period it is necessary to regenerate the solid particles. For example, in the catalytic cracking of hydrocarbons, carbonaceous material is deposited on the catalytic and inert solid particles. These particles are regenerated by burning off the carbonaceous material. The used solid particles containing catalyst are withdrawn from the annular space 23 by means of the sparger action of the regeneration gas jets 28 which are properly located around the bottom of annular space 29. Also, the rotatable baffle extension 31 moves, by mechanical means, the solid particles flowing downwardly from annular space 23 so as to prevent any channeling of the "seal" between regeneration zone and reaction zone. The rotatable baffle 30 prevents clogging of annular space 23 or of channeling action of stripping steam introduced through nozzles 25, thus insuring a dependable seal between reactor gases and regenerator gases. Furthermore, the extension 31 of rotatable baffle 30 directs the spent catalyst particles up the sparger space 29 and does not allow any particles to flow down into space 13 until they have been regenerated by travelling up sparger space 29 into space 34 and down.

A suitable regenerating gas such as air or other oxygen-containing gas is introduced through header 32 and jets 28. As above stated, the fluidized solid particles flowing downwardly in annular space 23 are siphoned up the sparger space 29 by the regenerating gas as a light suspension of solid particles. Stationary reflecting baffle 33 above annular space 29 returns these regenerated solid particles to the outside annular space 34 between the movable baffle wall 35 and outside chamber wall 36 where the regenerating gas jets 37 located properly around the bottom of the space 34 completes the regeneration reaction as well as fluidizes the solid particles sufficiently for downflow. Movable baffle wall 35 is so mounted within the chamber that it can be raised or lowered to increase or decrease the recycling space at the bottom near the regenerating gas jets 37 and 28. When the catalytic and inert solid particles are poor-flowing, suitable means may be provided for continuously moving baffle 35 slowly up and down to prevent clogging in the annular space 34. This is not usually necessary in free-flowing catalytic and inert solid particles used for cracking petroleum. At the bottom of the sparger-type regenerator 12 both spent catalyst from space 23 and recycled regenerated catalyst from space 34 are swept up by the regenerating gas stream. In addition a portion of the regenerated catalyst and inert solid particles from space 34 flow downwardly through space 13 to annular space in stand pipe 14 and out control valve 15. Stripping gas such as steam may be introduced at 51 to remove oxygen-containing gas.

Expansion chamber 39 may be enlarged and being a plenum chamber of large radius it is suitable for lowering the gas velocity sufficiently to lessen entrainment. The regeneration gases are piped from regenerator by outlet 40 and taken to dust precipitators and waste heat boilers, not shown. The combustion conditions in sparger space 29 can be adjusted for ideal proportions of oxygen and carbonaceous material which is much better than in a fluidized bed type of regenerator. Also, the low back pressure of the sparger 29 insures against "blowing-the-seal" in space 23.

When higher pressures are required in reaction zone 10 and regeneration zone 12, this compact arrangement of concentric chambers is efficient and economical. Furthermore, since the pressures are equalized in a proper manner between the two zones, the flows of solid particles proceed without surges.

The slowly rotating baffle assembly insures the flow of solid particles and prevents fouling of surfaces, thus permitting rather narrow spacings in annular passages where over-all reduction in size of chamber is desired.

In the embodiment shown in Fig. 2, the reaction zone 100 and regenerating zone 112 are integral and in the same relative position as in Fig. 1; however, in this form the fluidized catalytic and inert solid particles in the reaction zone are not recycled by a sparger arrangement. Instead, the oil feed through inlet 118 is vaporized upon contact with hot solid particles in stand pipe 114 and the light suspension of solids in gas flows up through duct 116 into the space below distribution grid 119 and boils up through the fluidized bed of solid particles in reactor 100. It overflows into space 123. The cracked vapors pass onto an expansion chamber not shown.

Stripping steam is introduced from header 124 and jets 125. In addition, cells are formed in annular space 123 by partitioning walls 122 shown in Fig. 3 which improve the contacting efficiency of the stripping steam. Also, in sparger space 129 these partitioning walls 122 serve to make a draft tube or cell for the jet of regenerating gas and solids stream. These same partitioning walls also divide the outside annular space 134 into cells for more efficient regeneration and fluidizing of downflowing regenerated catalyst solids.

The regeneration gas supply header 132 as in Fig. 2 develops the sparger action by means of nozzle 128 as described for Fig. 1 also proper combustion conditions, for regeneration of the spent catalyst and recycled catalyst streams.

The regeneration gas flows out through expansion chamber 139 and exhaust 140. The regenerated catalyst flows downwardly in space 113 to control valve 115 where the feed is regulated.

When additional heat is needed the solid particles in regenerator 112 can be "fired" with petroleum gases by adding gas nozzles (not shown) at the bottom of annular space 129.

In addition space 134 can be enlarged to serve as a larger reservoir for solid particles in process. The level of the solid particles in this space can be raised or lowered to get the correct heat balance and without materially affecting the combustion proportions in the regenerator sparger 129.

Additional fluidizing and regenerating gas can be added through header 150.

This invention deals primarily with the integral and compact system for moving a fluidized bed of solid particles through two reaction zones in the shortest possible path and vertically without the use of elbow turns or ducts and with symmetrical concentric chambers which can operate as moving baffles and being cylinders are properly shaped for high pressure chambers.

Furthermore this system is adaptable for use with various carrier-particle reactions wherein the carrier particle serves also as a heat transferring medium as well as a catalytic exposure medium. In most all cases the products from the regeneration zone cannot be mixed with the products of the reaction zone and this invention provides a method for making this separation and yet for moving the carrier particles from zone to zone in the most efficient manner and with proper barriers and proper spaces in which to strip the carrier particles of entrained gases which should not be carried over.

The device of Fig. 1 provides a system that is more adaptable to high-pressure catalytic reactions using carrier particles at temperatures and conditions which may not always be perfectly free-flowing and which tend to foul the surfaces The device of Fig. 2 provides a system free of moving parts and suitable for the conditions found in catalytic cracking of petroleum where low pressures, high temperatures and free-flowing carrier particles prevail.

The system is also applicable to work in the chemical field such as the synthesis of alcohols or fatty oils from hydrocarbons, or in the neutralization of fatty acids or synthetic detergent bases; in the former where high pressures are required in reactor and regenerator and in the latter where two temperature zones are desired.

This system is also applicable in the separation of solids from solids-bearing solutions. In such cases the feed can be accompanied with an entraining gas and the so-called regeneration-annular-zone will be used for cooling or further conditioning of the solid particles removed.

The preferred form of regenerator 12 shown in Figs. 1 and 2 is of a sparger type. However, a fluidized column may be used when desired.

From the above description it will be seen that all channels of flow for the carrier particles such as those shown at 23, 29, 34 and 13 have at least one moving bounding surface. Vanes or corrugations may be arranged on the moving surfaces to propel the carrier particles.

As shown in Fig. 4, the cylindrical baffle 35 may be made rotatable with the other baffles 30 and 31 by attaching it by means of spokes 45 that extend from baffle disk 31. The nozzles 28 are lowered below the spokes 45 and discharge upwardly between them as they rotate, thus generating the desired sparger action in space 29.

As shown in Fig. 5, entrainment gas can be introduced through duct 46. This gas then surrounds the main feed 47 having atomizing nozzles 48. Valved outlet 49 is for discharging the accumulated solids.

It will be clear from the above description that with this invention the two zone chambers (Fig. 1) may be used either as reactors or as regenerators in the catalytic cracking of petroleum. For example, it is usually desirable to use a rate of gas flow in either the reactor or the regenerator which is high and which violently tosses the solid catalytic particles about. However, this practice is limited because of high entrainment losses of solid particles. This entrainment is obviated with the present invention by using the inner zone 10, Fig. 1, for violent gas flows and by closing outlet 27 and forcing the gas to flow down through the solid-particle bed, which seals channel 23 so that the gases emerge on the other side of the stationary baffle 20 where, because of the greatly increased cross-section of the space between baffle 20 and chamber wall 36, the gas leaves the surface of the fluidized bed with a minimum of entrainment and leaves as clean gas through chamber 39 and outlet 40. In this case baffle 35 as well as the nozzle systems associated with inlet 32 and 24 are removed. The solids moving down through the channel 23 operate as a filter-bed to catch the finer particles that are entrained by the gas flow. This is equivalent to the "stripping" of a dust-bearing gas stream by means of a fluidized bed of solid particles of enlarged cross-section and also greatly lessening the velocity of this gas and greatly reducing the entrainment of dust.

Two complete two-zone units are arranged in a loop system similar to the conventional fluid-catalytic cracking loop, and one integral two-zone unit such as is shown in Fig. 1 is arranged to serve as a reactor and filter for the cracked vapors, while another similar integral two-zone unit is used as a regenerator and filter for the products of combustion. The principles of sedimentation are brought into play, and instead of using a large, slowly mechanically-swept chamber with solids settling in a liquid suspension, a large slowly mechanically-swept chamber, which is swept by baffle 31, with solids settling in a gas suspension is used. There is the conventional inner-turbulent-zone 10 in this chamber isolated by under-flow stationary baffle 20 from the quiet-sedimentation-outer-zone 12.

I claim:

1. In the cyclic process of catalytically cracking hydrocarbons and regenerating the catalyst, the improvements which comprise entraining hot catalyst particles in hydrocarbon vapors, passing the vapors and entrained catalyst particles upwardly in a confined reaction zone to crack said hydrocarbons, separating and removing cracked vapors from catalyst particles at the upper end of said reaction zone, returning a portion of said catalyst particles to a catalyst zone concentric with the reaction zone and gradually recycling the same to said reaction zone, passing another portion to a stripping zone concentric with and surrounding said catalyst zone for downward passage therethrough, stripping volatile material from the catalyst in the stripping zone, feeding stripped catalyst from the lower end of the stripping zone to a regeneration zone concentric with and surrounding said stripping zone, jetting regenerating gas into said regeneration zone and passing stripped catalyst upwardly in the regeneration zone by means of said jet action, thereby regenerating the catalyst, separating regenerating gases from the catalyst at the upper end of said regenerating zone and passing the latter to a standpipe concentrically surrounding the lower portion of said reaction zone and disposed below said catalyst, stripping, and regeneration zones, and then passing the catalyst from the standpipe to the bottom of said reaction zone to be entrained in additional quantities of hydrocarbon vapors.

2. In the cyclic process of catalytically converting hydrocarbons and regenerating the catalyst, the improvements which comprise entraining hot catalyst particles in hydrocarbon vapors, passing vapors and entrained catalyst particles upwardly in a confined reaction zone to convert said hydrocarbons, separating and removing vaporous material from catalyst particles at the upper end of said reaction zone, passing a portion of said catalyst particles downwardly to a catalyst zone concentric with the reaction zone and gradually recycling the same to said reaction zone, passing another portion downwardly through a stripping zone concentric with said catalyst zone, stripping the catalyst in the stripping zone, feeding stripped catalyst from the lower end of the stripping zone to a regeneration zone concentric with said stripping zone, jetting regenerating gas into said regeneration zone and passing stripped catalyst upwardly in the regeneration zone by means of said jet action, thereby regenerating the catalyst, separating regenerating gases from the catalyst at the upper end of said regenerating zone and passing the hot regenerated catalyst to the lower end of said reaction zone to make contact with additional quantities of heated hydrocarbon feed.

3. In the cyclic process of catalytically converting hydrocarbons and regenerating the catalyst, the improvements which comprise entraining hot catalyst particles in hydrocarbon vapors, passing the vapors and entrained catalyst particles upwardly in a confined reaction zone to convert said hydrocarbons, separating and removing vaporous material from catalyst particles at the upper end of said reaction zone, returning a portion of said catalyst particles to a catalyst zone concentric with the reaction zone and gradually recycling the same to said reaction zone, passing another portion to the upper end of a stripping zone concentric with said catalyst zone for downward passage therethrough, stripping volatile material from the catalyst in the stripping zone, feeding stripped catalyst from the lower end of the stripping zone to a regeneration zone concentric with said stripping zone, jetting regenerating gas into said regeneration zone and passing stripped catalyst upwardly in the regeneration zone by means of said jet action, thereby regenerating the catalyst, separating regenerating gases from the catalyst at the upper end of said regenerating zone and passing the latter to a standpipe concentric with said reaction zone and thence to the bottom of said reaction zone to make contact with additional quantities of heated hydrocarbon feed.

4. In the cyclic process for contacting a fluid with solid carrier particles, the improvements which comprise entraining said particles in the fluid, passing fluid and entrained particles upwardly in a contact zone, separating and removing the fluid from said particles at the upper end of said zone, passing a portion of said particles back to a particles zone concentric with the contact zone and gradually recycling the same to said contact zone, passing another portion of separated particles downwardly through a stripping zone concentric with said particles zone, stripping the particles in the stripping zone, feeding stripped particles from the lower end of the stripping zone to a second contact zone concentric with said stripping zone, jetting gas into said second contact zone and passing stripped particles upwardly in the second contact zone by means of said jet action, separating said gas from the particles at the upper end of said second contact zone and passing the latter to the inlet of said first contact zone to be entrained in additional fluid.

5. In apparatus for catalytically converting hydrocarbons and for regenerating the catalyst, the combination of an inner elongated rotatable reaction chamber, a standpipe for regenerated catalyst particles concentric with and surrounding the lower portion of said chamber, means for introducing preheated feed hydrocarbons to the lower end of said chamber, means for feeding hot regenerated catalyst from the standpipe into contact with said hydrocarbons at the inlet to the reaction chamber, whereby said hydrocarbon feed is flashed into vapors which pass upwardly into the reaction chamber and entrain catalyst particles, rotatable baffle means at the upper end of the reaction chamber for separating vaporous material from at least partially spent catalyst particles, a rotatable catalyst chamber adjacent the top of and concentric with the reaction chamber for receiving a portion of the separated partially spent catalyst particles, means for recycling partially spent catalyst from the catalyst chamber to the reaction chamber for upward passage therein, means for rotating said reaction chamber and baffle means and catalyst chamber, a catalyst stripping chamber concentric with said catalyst chamber and having a common wall therewith for receiving another portion of the separated partially spent catalyst particles, a regeneration chamber concentric with and surrounding the stripping chamber and having means for jetting regenerating gas to the lower end thereof, means for transferring stripped catalyst from the lower end of the stripping chamber to the lower end of the regeneration chamber for upward passage therein by means of the jet action developed by said jetting means, baffle means at the top of the regeneration chamber for separating regenerating gases from the catalyst, and means for transferring regenerated catalyst from the regeneration chamber to said standpipe.

6. In apparatus for carrying out catalytic reactions and for regenerating the catalyst, the combination of an inner reaction chamber, a standpipe for regenerated catalyst particles communicating with the lower portion of said chamber, means for introducing reactants to the lower end of said chamber, means for feeding hot regenerated catalyst from the standpipe into contact with said reactants at the inlet to the reaction chamber, whereby said reactants are flashed into vapors which pass upwardly into the reaction chamber and entrain catalyst particles, means at the upper end of the reaction chamber for separating vaporous material from at least partially spent catalyst particles, a catalyst chamber adjacent the upper end of and concentric with the reaction chamber for receiving a portion of the separated partially spent catalyst particles, means for recycling partially spent catalyst from the catalyst chamber to the reaction chamber for upward passage therein, a catalyst stripping chamber concentric with said catalyst chamber for receiving another portion of the separated partially spent catalyst particles, a regeneration chamber concentric with the stripping chamber and having means for jetting regenerating gas to the lower end thereof, means for transferring stripped catalyst from the lower end of the stripping chamber to the lower end of the regeneration chamber for upward passage therein by means of the jet action developed by said jetting means, means at the upper end of the regeneration chamber for separating regenerating gases from the catalyst, and means for transferring regenerated catalyst from the regeneration chamber to said standpipe.

7. In apparatus for carrying out catalytic reactions and for regenerating the catalyst, the combination of an inner rotatable reaction chamber, a standpipe for regenerated catalyst particles communicating with the lower portion of said chamber, means for introducing reactants to the lower end of said chamber for upward passage therein, means for feeding hot regenerated catalyst from the standpipe into contact with said reactants at the inlet to the reaction chamber, whereby said reactants are vaporized and entrain catalyst particles, rotatable baffle means at the upper end of the reaction chamber for separating vaporous material from at least partially spent catalyst particles, means for rotating said reaction chamber and baffle means, a catalyst stripping chamber concentric with said reaction chamber for receiving separated partially spent catalyst particles, a regeneration chamber concentric with and surrounding the stripping chamber and having means for jetting regenerating gas to the lower end thereof, means for transferring catalyst from the lower end of the stripping chamber to the lower end of the regeneration chamber for upward passage therein by means of the jet action developed by said jetting means, baffle means at the top of the regeneration chamber for separating regenerating gases from the catalyst, and means for transferring regenerated catalyst to said standpipe.

8. In apparatus for contacting fluids with solid carrier particles the combination of an inner rotatable contact chamber, a standpipe for said particles communicating with the lower portion of said chamber, means for introducing input fluid to the lower end of said chamber for upward passage therein, means for feeding solid particles from the standpipe into contact with said fluid at the inlet to the chamber, whereby said fluid entrains said particles, rotatable baffle means at the upper end of the chamber for separating said fluid from said particles, a rotatable carrier particles chamber adjacent the upper end of and concentric with the contact chamber for receiving a portion of the separated particles, means for recycling particles from the carrier particles chamber to the contact chamber for upward passage therein, means for rotating said contact chamber and baffle means and carrier particles chamber, a stripping chamber concentric with said carrier particles chamber and having a common wall therewith for receiving another portion of the separated particles for downward passage therein, a second contact chamber concentric with and surrounding the stripping chamber, means for jetting a second fluid to the lower end of said second contact chamber, means for transferring particles from the lower end of the stripping chamber to the lower end of the second contact chamber for upward passage therein by virtue of the jet action developed by said jetting means, baffle means at the upper end of the second contact chamber for separating fluid from the particles, and means for transferring the particles to said standpipe.

9. In apparatus for contacting fluids with solid carrier particles the combination of an inner contact chamber, a standpipe for said particles communicating with the lower portion of said chamber, means for introducing input fluid to the lower end of said chamber for upward passage therein, means for feeding particles from the standpipe into contact with said fluid at the inlet to the chamber, whereby said fluid entrains said particles, means at the upper end of the chamber for separating said fluid from said particles, a carrier particles chamber adjacent the upper end of and concentric with the contact chamber for receiving a portion of the separated particles, means for recycling particles from the carrier particles chamber to the contact chamber for upward passage therein, a stripping chamber concentric with said carrier particles chamber for receiving another portion of the separated particles, a second contact chamber concentric with the stripping chamber and having means for jetting a second fluid to the lower end thereof, means for transferring particles from the lower end of the stripping chamber to the lower end of the second contact chamber for upward passage therein by means of the jet action developed by said jetting means, means at the upper end of the second contact chamber for separating fluid from the particles, and means for transferring the particles to said standpipe.

10. In apparatus for contacting fluids with solid carrier particles the combination of an inner rotatable contact chamber, a collecting zone for said particles communicating with the lower portion of said chamber, means for introducing input fluid to the lower end of said chamber for upward passage therein, means for feeding solid particles from the collecting zone into contact with said fluid at the inlet to the chamber, whereby said fluid entrains said particles, rotatable baffle means at the upper end of the chamber for separating said fluid from said particles, means for rotating said contact chamber and baffle means, a stripping chamber concentric with said contact chamber for receiving said separated particles for downward passage therein, a second contact chamber concentric with and surrounding the stripping chamber and having means for jetting a second fluid to the lower end thereof, means for transferring particles from the lower end of the stripping chamber to the lower end of the second contact chamber for upward passage therein by virtue of the jet action developed by said jetting means, baffle means at the upper end of the second contact chamber for separating fluid from the particles, and means for transferring the particles to said collecting zone.

DONALD E. MARSHALL.

REFERENCES CITED

The following references are of record in the file of this patent:

UNITED STATES PATENTS

| Number | Name | Date |
| --- | --- | --- |
| 2,428,872 | Gunness | Oct. 14, 1947 |
| 2,433,726 | Angell | Dec. 30, 1947 |